Feb. 20, 1940.  L. E. LA BOMBARD  2,190,948
TRANSFER MACHINE
Filed Sept. 14, 1937  6 Sheets-Sheet 1

FIG. 1.

INVENTOR:
Leon E. La Bombard,
BY Bodell & Thompson
ATTORNEYS.

Feb. 20, 1940.    L. E. LA BOMBARD    2,190,948
TRANSFER MACHINE
Filed Sept. 14, 1937    6 Sheets-Sheet 6

FIG. 6

INVENTOR:
Leon E. LaBombard,
BY Bodell & Thompson
ATTORNEYS.

Patented Feb. 20, 1940

2,190,948

UNITED STATES PATENT OFFICE 2,190,948

TRANSFER MACHINE

Leon E. La Bombard, Nashua, N. H., assignor to Oswego Falls Corporation, Fulton, N. Y., a corporation of New York Application September 14, 1937, Serial No. 163,833

7 Claims. (Cl. 95—73)

This invention relates to a machine for transferring an image or outline on a film to the surface of a metallic cylinder preparatory to etching the cylinder, and thereafter using the cylinder to reproduce the image or outline on paper, or like material, by printing, or a similar process.

The apparatus herein referred to has to do particularly with the transfer, or series of transfers, of the image on the film to the metallic cylinder. That is, the cylinder at the end of the process bears a plurality of such images or outlines on the film, and the impressed images are equally spaced about the periphery of the cylinder.

The general and common method employed in constructing these cylinders may be briefly stated as follows: A photograph is taken of a drawing or object, the film is developed, the surface of the cylinder is coated with sensitized material, and the image or outline on the film is transferred to the surface of the cylinder. The surface of the cylinder is then developed and coated, and subsequently etched by immersing the cylinder in a suitable solvent, such as acid, and the cylinder is then in condition to be used in the printing press.

The apparatus herein set forth has to do only with the transfer of the image or outline from the film to the sensitized surface of the cylinder.

As a general rule, the paper is run through the printing press in the form of a continuous web at a comparatively high speed. In order that the printing cylinder will not have to be run at an excessive high speed, or at a speed above that suitable for proper printing, the printing cylinders are of substantial diameter usually equal to that of the feeding rolls and accordingly are timed to rotate in synchronism with the feeding rolls. Often, the image or outline to be printed is not sufficient in extent to cover the entire periphery of the printing cylinder, and two or more images or prints are impressed upon the cylinder. That is, in one revolution of the cylinder, the picture may be impressed two or more times. Where the printed matter consists of catalog sheets, or the like, it is not important that the images be spaced accurately about the cylinder. This is due to the fact that the web is subsequently severed into separate sheets and the sheets are all trimmed to size in the binding of the book. However, in connection with printing of a web from which portions are to be subsequently blanked out and used in the fabrication of some article, such as a paper bottle or cup, it is important that the images, or printed matter, be arranged in uniform spaced relation about the periphery of the cylinder.

More particularly, it is extremely important that the images or prints be accurately spaced about the surface of the printing cylinder where the printing is to be done in two or more colors. If the impressions on one color cylinder are not accurately spaced, the printing produced by such cylinder will be in offset relation to the printing produced by subsequent cylinders. Heretofore, it has been extremely difficult, if not impossible, to reproduce the images from the photographic film to the sensitized surface of the cylinder and have such images in accurately spaced relationship on the cylinder. The usual procedure in this connection is to develop a film long enough to contain the number of images desired to be impressed upon the cylinder, and to subsequently run the film about the cylinder. The first difficulty is incurred in attempting to accurately position the plurality of separate images on the film. The second difficulty is incurred in the manipulation of the film and cylinder so as not to have any relative movement between the film and the cylinder during the transfer operation. This is extremely difficult due to slippage or creepage of the film on the cylinder while the same is being rotated both circumferentially and axially of the cylinder. Also, due to change in atmospheric conditions the film has a tendency to shrink or expand causing the images on the cylinder to be unevenly spaced.

My invention has as an object a machine or apparatus by which a single image on a film can be quickly and conveniently transferred to a plurality of positions about the surface of the printing cylinder and with each image on the cylinder being equally spaced relative to the other images with extreme accuracy.

The machine embodies a particularly economical and an efficiently operable structure which will accommodate printing cylinders of different sizes.

The invention consists generally of a suitable frame, means for rotatably mounting a sensitized metallic cylinder thereon, a pair of rotatably mounted spaced apart drums, means for synchronizing the rotation of the cylinder and the drums, means carried by each of said drums and operable to detachably secure the end of a film thereto, and means operable to maintain the central portion of the film in contact with the surface of said cylinder during rotatable movement of the cylinder and the drums.

The invention consists in the novel features and in the combinations and constructions hereinafter set forth and claimed.

In describing this invention, reference is had to the accompanying drawings in which like characters designate corresponding parts in all the views.

In the embodiment of the invention as here shown, the frame of the machine is designated generally as 10, and consists of horizontal side members 11, and a vertically extending rear portion 12. The frame is mounted upon a suitable support or bench 13. The upper edges of the side members 11 are formed or provided with suitable tracks or ways 14 which extend rearwardly from the front of the machine to a point substantially at the center of the frame, and in which bearings 15 are slidably mounted. The base of the bearings 15 are threaded as at 16 to receive the screws 17, the outer ends of which are rotatably supported by suitable brackets or bearings 18. The outer ends of the screws 17 are also arranged to have an axial sliding movement relative to the bearings 18, the inner limit of which is controlled by a collar 19, and the outer movement controlled by the helical compression spring 20 encircling the screw 17 and interposed between the inner face of the bearing 18 and an antifriction thrust bearing 21 adjustably mounted upon the screw 17. A sprocket wheel 25 is secured to the outer end of each of the screws 17 and connected by a chain 26. One of the screws 17 is provided with a crank or operating manual 27.

It will be observed from the description thus far that upon rotation of the manual 27, the bearing members 15 are moved forwardly and rearwardly relative to the rear portion 12 of the frame. The bearings 15 support a shaft 30 provided at each end, adjacent the brackets 15, with antifriction bearings 31 on which are rotatably mounted disks or rollers 32.

The upwardly extending rear portions 12 of the side members of the frame are provided with bushings 33 in which is rotatably mounted a shaft 34, and secured to which are spaced apart end plates 35, 36, of a drum 37. The inner faces of the end plates 35, 36 are recessed at their peripheries, as at 38, to receive the ends of the drum 37. The end plates 35, 36, are keyed to the shaft 34, as at 39, and are rotatable therewith. Means is provided for moving the end plate 35 axially of the shaft 34 to effect a frictional engagement between the drum 37 and the end plates 35, 36. The shaft 34 is provided with a collar 40 fixed to the shaft and against which the end plate 36 abuts and the bushing 33, adjacent the end plate 35, is provided with a collar 41 which coacts with the hub portion of the end plate 35, and the shaft 34 is threaded at this end and provided with a hand wheel 42, the hub of which coacts with the outwardly projecting end of the bushing 33. The bushing 33 and collar 41 are slidable axially in the frame portion 12.

When the hand wheel 42 is screwed, or tightened, on the end of the shaft 34, the bushing 33 moves inwardly, and the collar 41 thereof slides the end plate 35 inwardly against the adjacent end of the drum 37 which, in turn, moves the end plate 36 against the shoulder 40 on the shaft 34. The drum 37 is then fixedly connected to the shaft 34. A disk 45 is secured to the opposite end of the shaft 34 and is operatively connected to the actuating mechanism of the machine, as will be hereinafter set forth.

Figure 6:
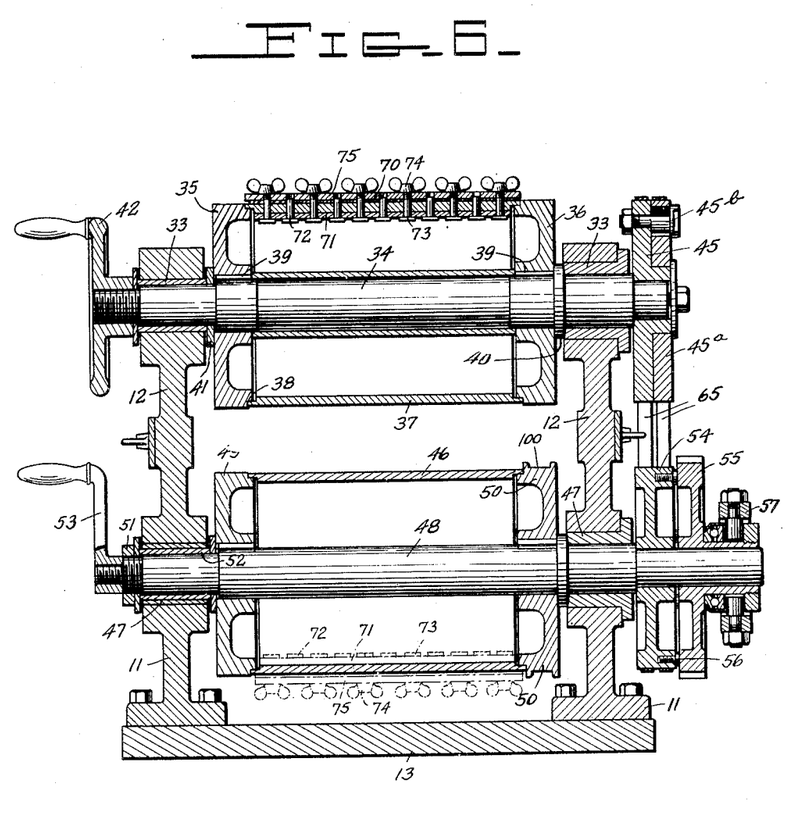
Figure 6 is a vertical sectional view taken on lines 6—6, Figure 2.

A drum 46, of substantially duplicate construction, is rotatably mounted directly below the drum 37, with the exception that the drum 46 is not releasable relative to the shaft on which it is keyed. The side members of the frame are provided with suitable bushings 47 in which is rotatably mounted a shaft 48 which, in turn, carries end plates 49, 50, similar in construction to end plates 35, 36. The outer end of the shaft 48, to the left Figure 6, is threaded and provided with lock nuts 51 which coact with a sleeve 52 slidably mounted upon the shaft 48 in the bushing 47, and which coacts with the hub of the end plate 49 to slide the same inwardly, whereby the drum 46 is gripped between the end plates 49, 50, in a manner similar to the drum 37. The loc knuts 51 are initially tightened and are not intended to be released during the transfer operation.

The outer end of the shaft 48 is provided with a suitable manual 53. The opposite end of the shaft is also provided with a disk 54 arranged in alinement with the disk 45, and is also provided with a suitable sprocket pulley 55 which is operatively connected to the shaft 48 through a friction clutch 56 consisting of leather washers between the disk 54 and sprocket 55, and which is actuated to engaged position by the fork 57 pivoted to a bracket 58 extending from the side of the frame, and the opposite end of the yoke 57 is pivotally connected to a rod 59, as at 60. The rod 59 extends transversely of the frame of the machine and at its end, on the opposite side of the machine, is provided with a suitable operating manual 61.

The clutch is normally maintained in engagement by a helical compression spring 62 interposed between the frame of the machine and an adjustable collar 63 carried on the rod 59. As here shown, the disks 45, 54 and accordingly, the shafts 34, 48 are operatively connected together to move in absolute synchronism by means of bands or steel tapes 65. The tapes 65 are secured to the disks 45, 54, by means of clamping members 66. The purpose of employing the steel tapes 65 is to avoid any back-lash between the drums 37, 46, as would be the case if gears were employed, or any slipping or relative movement between the drums, as would happen if belts or other friction means were employed. The tapes 65 are placed over the disks 45, 54, and the ends of the tapes are secured to the disks by the clamp member 66. The disk 45 is divided into two sections. The outer section 45ª is rotatable relative to the inner section. After the tapes 65 have been secured to the disks, the section 45ª is rotated relative to the adjacent section until the tapes are drawn taut and the sections of the disk 45 are then secured in operative position by clamp 45ᵇ. The machine is actuated by a motor 67, the speed of which is materially reduced by the reducing mechanism 68, the driving end of which is operatively connected with the sprocket 55 by means of a chain 69.

The drums 37, 46 are provided with means for attaching the ends of the film 70 thereto. As here shown, a bar 71 is secured in the bore or inner surface of the drums 37, 46. The bar 71 carries a plurality of studs 72 which extend through the drum and project a short distance beyond the periphery thereof. The bar 71 also carries a plurality of studs 73 which are longer than the studs 72, and the outer ends of which are threaded to receive the wing nuts 74. A detachable bar 75 is provided with a series of apertures to receive the studs 72, 73, and is arranged beneath the wing nuts 74, so that it may be clamped down against the periphery of the drum. The film is provided with a series of apertures complemental in spacing to the studs 72, 73. The wing nuts 74 and the bars 75 are removed, and the end of the film placed over the ends of the studs 72, 73. The bar is then placed on top of the end of the film, and the film is clamped between the bar 75 and the periphery of the drum upon tightening of the wing nuts 74.

The metallic cylinder, which is usually formed of copper and on which the image is to be transferred from the film 70, is indicated at 80. Means is provided for rotatably mounting the cylinder 80 in the frame of the machine in juxtaposition to the film 70, and to effect rotation of the same so that the peripheral speed thereof is exactly equal to the speed at which the film 70 travels upon rotation of the drums 37, 46. The cylinder 80 is mounted upon end plates 81, 82 which are slidably mounted on a sleeve 83. One end of the sleeve 83 is formed or provided with an index plate 84, and the opposite end is threaded as at 85 to receive the collar 86. The end plate 82 abuts against a fixed collar on the sleeve, or as here shown against a spacer 87 which, in turn, abuts against the index plate 84 fixed to the sleeve 83. Preferably, a spacer 88 is interposed between the collar 86 and the end plate 81.

The sleeve 83 is slidably mounted upon a shaft 90 extending transversely of the frame of the machine, and a disk 91 is secured to one end of the shaft.

As here shown, the disk 91 abuts against a shoulder 92 formed on the shaft and is held in engagement therewith by means of a threaded collar 93. The opposite end of the shaft is provided with a second disk 94 which abuts against a shoulder 95 and is held in place by a threaded collar 96. The side members 11 of the frame are provided with suitable blocks 97 to preliminarily support the free ends of the shaft 90 when the cylinder assembly, just described, is initially placed in the machine.

The spacing of the shoulders 92, 95 on shaft 90 is such that there is a slight clearance of a few thousandths of an inch between the ends of the cylinder assembly. That is, between the ends of the sleeve 83 and the disks or plates 91, 94, whereby the cylinder assembly is freely rotatable on the shaft 90 without any perceptible end play.

It will be observed that the end plate 50 of lower drum 46 is provided with a peripheral groove or recess 100, and it is to be remembered that the end plates 49, 50 and drum 46 are not in any way moved or adjusted axially during the operation of the machine. The groove 100 in end plate 50 is of the same width as the disk 94. That is, when the periphery of the disk 94 is in contact with the groove 100, there is no relative axial movement between the disk 94 and the end plate 50.

Figure 1:
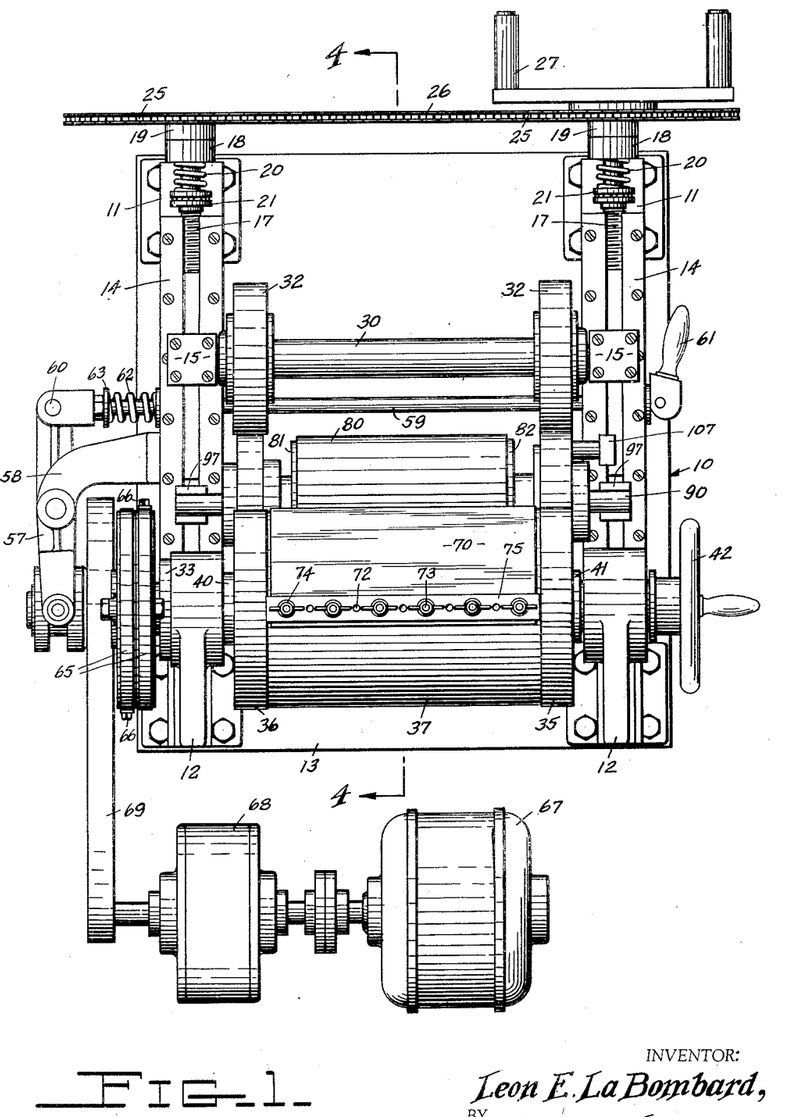
Figure 1 is a top plan view of the transfer machine.
Figure 2:
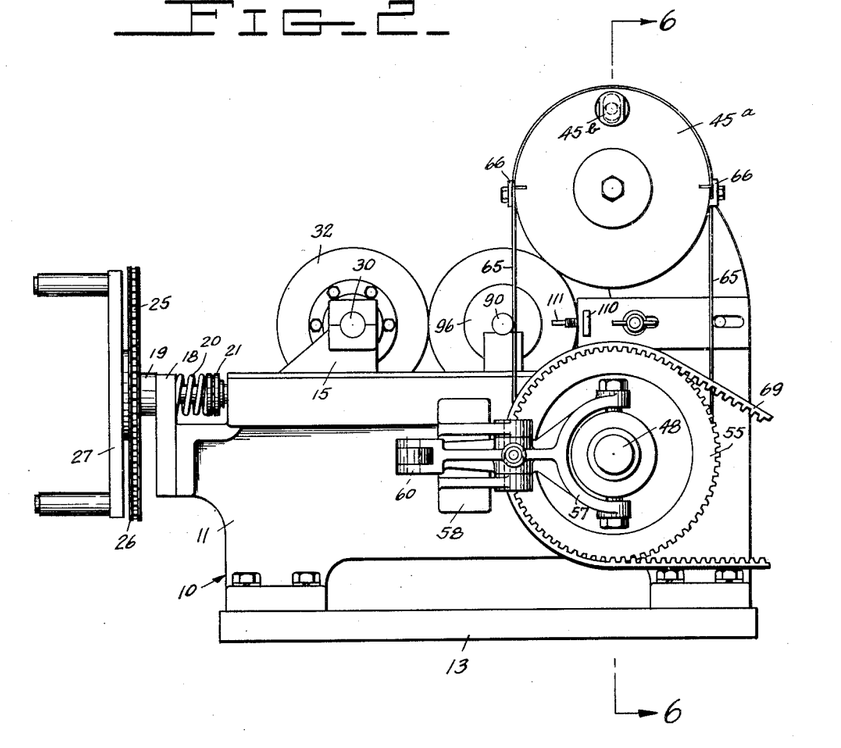
Figure 2 is a side elevation looking to the right, Figure 1.
Figure 3:
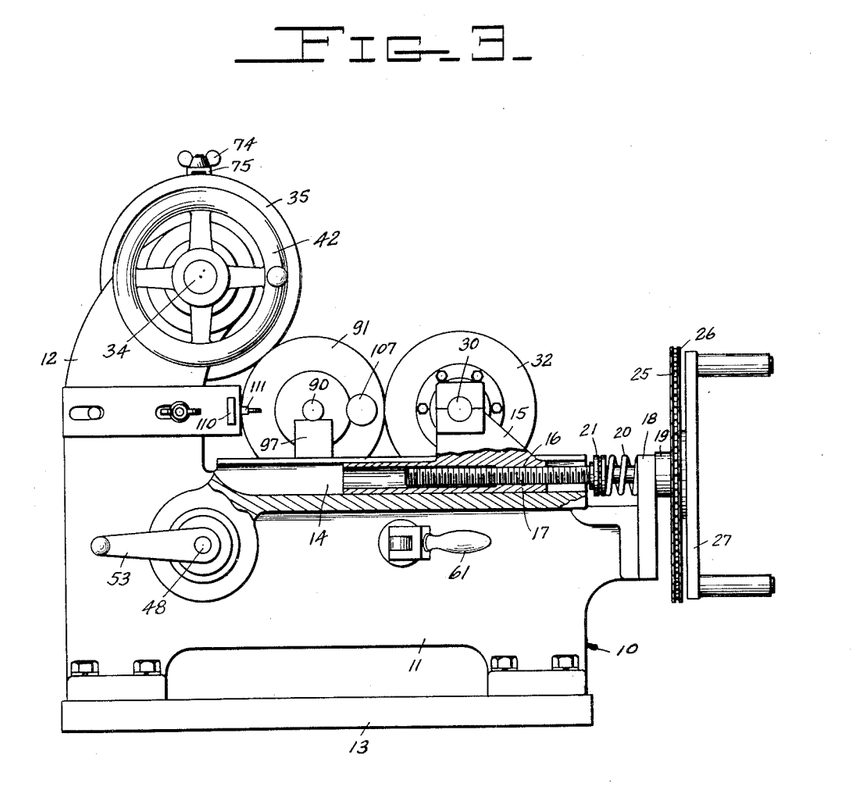
Figure 3 is a side elevation, with parts broken away, looking to the left, Figure 1.

The center distance between the drums 37 and 46 and the diameter of the end plates 35, 36, 49, 50, are such that when the cylinder assembly, including the disks 91, 94, are moved rearwardly, these disks contact the periphery of the end plates of the drums 37, 46, as indicated in Figure 3. The disks 91, 94, also contact the disks 32. That is, after the cylinder assembly has been initially placed in the machine, with the disk 94 arranged in the groove 100, the manual 27 is operated and the brackets 15 moved rearwardly carrying the rollers or disks 32. These, in turn, contact the disks 91, 94, and move them into engagement with the end plates 35, 36, 49, 50, of the drums 37, 46. When these disks contact further rearward movement of the brackets 15 ceases and thereafter, upon further rotary movement of the manual 27, the helical springs 20 are compressed, with the result that the pressure between the respective disks can be obtained, as desired. The object is to create sufficient pressure between the disks, particularly between the disks 91, 94, and end plates 35, 36, 49, 50, so that there will be no possibility of any slippage or lost motion between the drums 37, 46 and the cylinder 80. Once this contact is established, it is not disturbed during the transfer of the image from the film 70 to the cylinder 80. It will be understood that the ends of the film 70 have been attached to the drums 37, 46, as hereinbefore described, previous to the insertion of the cylinder assembly in the machine, and the contact between the disks 91, 94 and the end plates of the drums.

Figure 4:
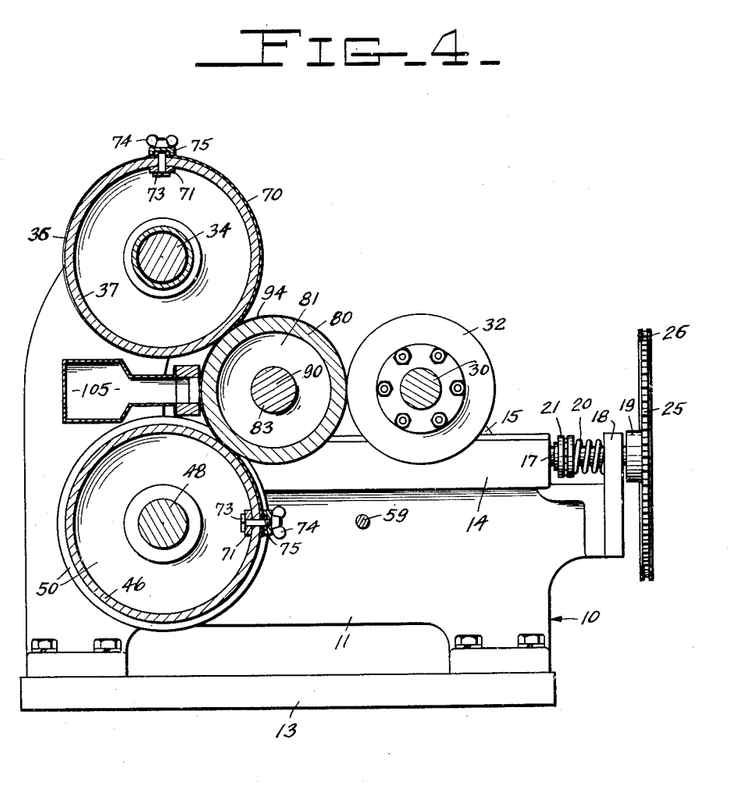
Figure 4 is a central longitudinal view taken on lines 4—4, Figure 1.
Figure 5:
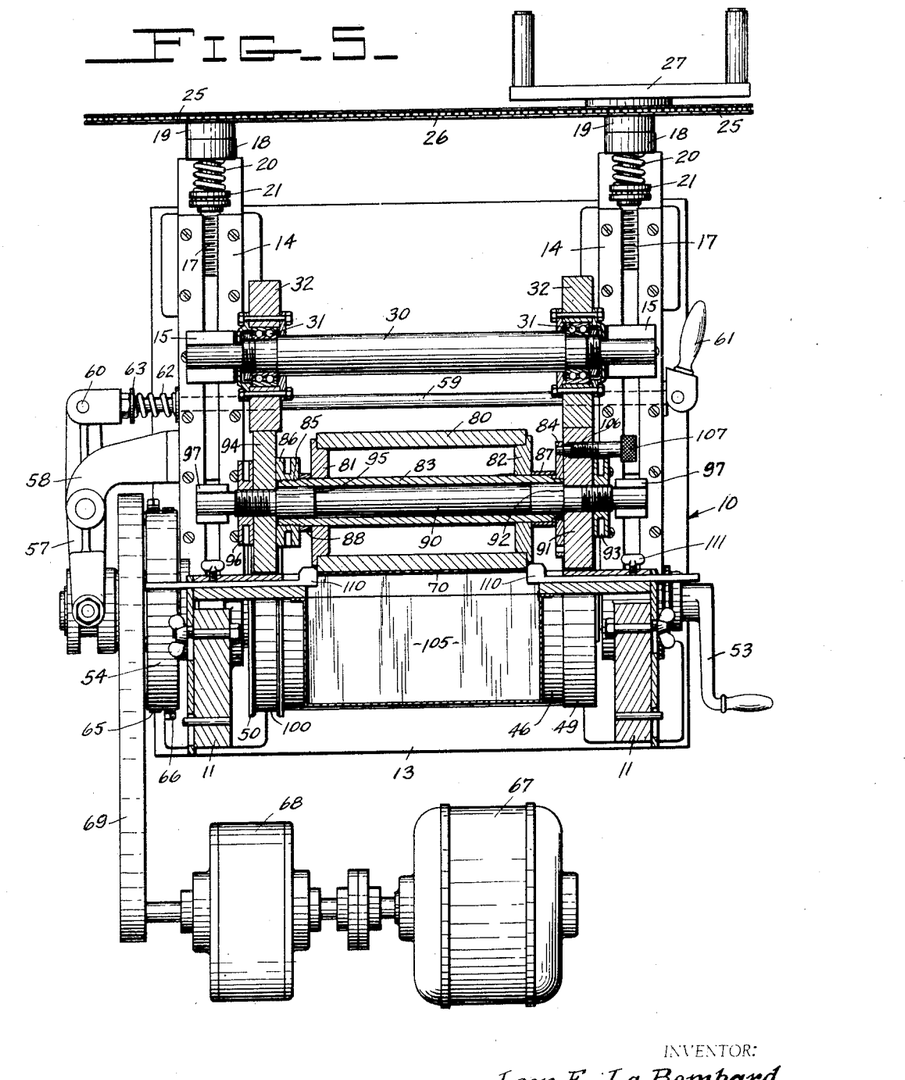
Figure 5 is a top plan view partly in section.

During these operations, the hand wheel 42 is unscrewed, or loosened, permitting the drum 37 to revolve freely relative to the shaft 34. This permits a sufficient amount of slack in the film. After the cylinder assembly has been moved into contact with the drums 37, 46, the drum 37 is then moved counter-clockwise Figure 3, until sufficient tension or contact is established between the film and the surface of the cylinder 80, at which time the hand wheel 42 is tightened and the drum 37 is then operatively connected to the end plates 35, 36. It will be understood that a light source is provided on the side of the film opposite to that in contact with the cylinder 80, as indicated in Figure 4, at 105.

With the clutch 56 in disengaged position, the drums 37, 46 and cylinder 80 are rotated by the manual or crank 53 to bring the fulcrum to the starting position. The manual 61 is then operated permitting engagement of the clutch 56, and the motor 67 imparts rotary movement to the drums 46, 37 and the respective end plates 49, 50, 35, 36, and because of the contact of the disks 91, 94 with the end plates of the drum, rotary motion is also imparted to the cylinder 80 and during this movement the light 105 is on and the image on the film is transferred to the cylinder. It will be observed that because of the connection between the disks 54, 45, through the bands 65, there is no relative movement between the drums 37, 46, and because of the high pressure frictional contact between the disks 91, 94 and the end plates of the drums, the entire mechanism must move in absolute unison, and the image or outline on the film will be transferred to the sensitized surface of the cylinder 80.

As heretofore stated, the apparatus herein described is employed where it is necessary to impress a number of images about the surface of the cylinder 80 and have each image arranged in accurate spaced apart relationship to the other images. For example, we will assume that six images are required on the cylinder 80. Means is provided for transferring these six images and arranging them in accurate relationship on the cylinder 80. The disk 91 is provided with an aperture 106 in which a pin 107 is movable axially, and is provided at its inner end with a point engaging the holes in the index plate 84 secured to and rotatable with the cylinder 80.

After the drums 37, 46, and the cylinder 80 have revolved through a sufficient arc to effect the transfer of the image from the film 70 to the cylinder 80, the manual 61 is then operated to disengage the clutch 56 and simultaneously the light source 105 is shut off. The drums 37, 46 and cylinder 80 are then rotated in reverse direction by the manual 53 to the starting position. The hand wheel 42 is released or loosened, effecting a release of the drum 37 from the end plates 35, 36. It will be understood that the end plates 35, 36, and the drum 37 are accurately machined, and it requires only an axial movement of a few thousandths of an inch of the end plate 35 to tighten or loosen the drum 37. The drum 37 may be now revolved by hand sufficiently to produce a slight slack in the film 70.

In order to prevent the escapement of light from source 105 on the sensitized surface of cylinder 80, a pair of guard members 110 are slidably mounted in the frame of the machine and are adjustable toward and from the ends of the cylinder 80 and are maintained in adjusted position by thumb screws 111. The purpose of having the guard members 110 slidably mounted is to accommodate cylinders 80 of different lengths.

The index pin 107 is moved outwardly from engagement with index plate 84 and the cylinder assembly turned manually on shaft 90 by grasping the end plates 81, 82. The cylinder 80 is revolved until the index pin may be moved inwardly to engage the next aperture in the index plate. The drum 37 is then readjusted to establish the proper contact between film 70 and cylinder 80 and the hand wheel 42 tightened. The light source is then turned on and the clutch 56 engaged, and a second print of the image on the film is transferred to the surface of the cylinder.

This operation is repeated according to the number of images to be transferred to the cylinder 80. After all of the images have been so transferred, the disks 32 are released by operation of the manual 27 and the cylinder assembly removed from the machine. The collar 96 is removed permitting removal of the disk 94, and the collar 86 is removed permitting removal of the end plate 81 and the cylinder 80. The cylinder may be then developed and subsequently etched.

It will be observed that the shafts 34, 48 may be adjusted rotatably relative to each other by means of the disks 45, 45ᵃ and clamping member 45ᵇ. This adjustment is employed to obtain the proper initial tension on the film and to accommodate films varying in length. The final tension desired on the film can be obtained by rotating the upper drum 37 relative to the shaft 34 and then locking the drum to the shaft by tightening the hand wheel 42.

It will be further noted that the film may be attached to the drums 37, 46 quickly and in a particularly convenient manner. Also that the shaft 90, with the cylinder assembly thereon, is conveniently mounted in the machine and the cylinder 80 is conveniently adjusted relative to the shaft 90 and the film for each subsequent exposure. Cylinders on which the images are transferred by this machine are extremely accurate as to the spacing between the images, and the image on the film can be quickly and conveniently transferred to a number of different cylinders for use in multi-colored printed work, and due to the extreme accuracy of the spacings of the images on the cylinder, there is no perceptible overlap in the printing process.

What I claim is:

1. A machine for effecting successive transfers of a single image on a photographic film to the sensitized surface of a cylinder with each transferred image being arranged on the cylinder in a predetermined position, said machine comprising a frame, a pair of drums journalled in the frame in spaced apart relationship, a shaft arranged in the frame and extending in parallel relationship to said drums and being provided with cylindrical end members, said cylinder being mounted upon said shaft intermediate said end members, said drums being provided with means for detachably securing the ends of the film thereto, and means yieldingly urging said shaft toward said drums to bring the end members in engagement with the periphery of the ends of the drums, and a portion of the periphery of the cylinder into engagement with the film, a light source arranged on the side of the film opposite to said cylinder, and means operable to effect rotation of said drums and shaft.

2. A machine for effecting successive transfers of a single image on a photographic film to the sensitized surface of a cylinder with each transferred image being arranged on the cylinder in a predetermined position, said machine comprising a suitable frame, a pair of drums journalled in the frame in spaced apart relationship, a shaft arranged in the frame and extending in parallel relationship to said drums and being provided at its ends with disk members, said cylinder being rotatably mounted upon said shaft intermediate said disk members, a driving member carried by one of said end members and engaging said cylinder to effect rotation of the same upon rotation of said shaft and being operable to disengage from said cylinder, said drums being provided with means for detachably securing the ends of the film thereto and means for yieldingly urging said shaft toward said drums to bring the disk members in engagement with the ends of said drums, and a portion of the periphery of the cylinder into engagement with said film, a light source arranged on the side of the film opposite to said cylinder, and means operable to effect synchronized rotation of said drums and shaft.

3. A machine for effecting successive transfers of a single image on a photographic film to the sensitized surface of a cylinder with each transferred image being arranged on the cylinder in a predetermined position, said machine comprising a suitable frame, a pair of drums journalled in the frame in parallel spaced apart relation one above the other, a shaft rotatably supported in the frame, a disk mounted on each end of the shaft, said shaft being movable toward said drums to effect engagement of the periphery of said disks with the respective end portions of said drums, a pair of rollers journaled in the frame and arranged to engage said disks in peripheral contact, means operable to move said rollers in engagement with said disks and to move said disks in engagement with said drums, whereby said drums, disks and rollers rotate in synchronism, each of said drums being provided with means for detachably securing one end of the film thereto, indexing means operable to connect the cylinder to one of said disks intermediate the same with the periphery of the cylinder in contact with said film intermediate its ends, means associated with one of said drums to release the tension on the film during indexing of the cylinder relative to said disks, and a light source arranged on the side of the film opposite to said cylinder.

4. A machine for effecting successive transfers of a single image on a photographic film to a sensitized surface of a cylinder with each transferred image being arranged on the cylinder in a predetermined position, said machine comprising a frame, a pair of drums rotatably mounted in the frame and arranged in spaced apart parallel relationship, a shaft journalled in the frame and extending in parallel relationship to said drums and arranged in a plane intermediate the axes thereof, said shaft being provided with cylindrical end members, said cylinder being arranged on said shaft intermediate said cylindrical end members, means cooperable with said shaft and said cylinder to permit rotatable adjustment of the cylinder relative to said shaft and to detachably secure the cylinder to the shaft in adjusted position, each of said drums being provided with clamping means to detachably secure the ends of said film to said drums respectively, means operable to yieldingly urge said shaft toward said drums and to maintain said cylindrical end portions of the shaft in frictional engagement with the peripheries of said drums and a portion of the periphery of the cylinder in engagement with the intermediate portion of the film, a light source arranged on the side of the film opposite to said cylinder, and means operable to effect rotation of said drums and shaft.

5. A machine for effecting successive transfers of a single image on a photographic film to a sensitized surface of a cylinder with each transferred image being arranged on the cylinder in a predetermined position, said machine comprising a frame, a pair of drums journalled in the frame and arranged in spaced apart parallel relationship, a shaft journalled in the frame with its axis extending parallel to the axes of said drums and being arranged in a plane intermediate the axes of said drums, means carried by said shaft for rotatably mounting said cylinder thereon, and indexing means carried by said shaft and cooperable with said cylinder to detachably secure the same to the shaft, said shaft being provided with enlarged cylindrical end members arranged to engage the peripheries of said drums, a pair of rollers journalled in the frame and arranged for peripheral contact with said enlarged cylindrical end members on said shaft, each of said drums being provided with clamping means for detachably securing the respective ends of the film to said drums, means operable to move said rollers into engagement with said cylindrical end members and to move said members into engagement with the peripheries of said drums, with a portion of the periphery of the cylinder in engagement with said film, whereby said drums and cylinder are caused to rotate in unison, a light source arranged on the side of the film opposite to said cylinder, and motive means operable to effect rotation of said drums and shaft.

6. A machine for effecting successive transfers of a single image on a photographic film to a sensitized surface of a cylinder with each transferred image being arranged on the cylinder in a predetermined position, said machine comprising a frame, a pair of drums journalled in the frame with their axes extending in parallel spaced apart relationship, a shaft journalled in the frame with its axis extending parallel to the axes of said drums and being provided with cylindrical end members arranged to engage the peripheries of said drums adjacent the ends thereof, means for detachably securing said cylinder on said shaft intermediate said end portions, each of said drums being provided with clamping means for detachably securing the respective ends of the film to said drums, motion transmitting means connecting said drums and operable to maintain uniform tension on said film during rotation of said drums, means yieldingly urging said shaft toward said drums to maintain said cylindrical end members in contact with the peripheries of said drums, and a portion of the periphery of the cylinder in engagement with the intermediate portion of said film, whereby said cylinder is caused to rotate in synchronism with the movement of said film, a light source arranged on the side of the film opposite to said cylinder, and means operable to effect rotation of said drums.

7. A machine for effecting successive transfers of a single image on a photographic film to a sensitized surface of a cylinder with each transferred image being arranged on the cylinder in a predetermined position, said machine comprising a frame, a pair of drums journalled in the frame with their axes extending in parallel spaced apart relationship, a shaft journalled in the frame with its axis extending parallel to the axes of said drums and being provided with cylindrical end members arranged to engage the peripheries of said drums adjacent the ends thereof, each of said drums having a central portion provided with clamping members for detachably securing the respective ends of the film to said drums, motion transmitting means connecting said drums and operable to effect rotation of said drums in unison, the clamp carrying portion of one of said drums being rotatable relative to the end portions of the drum to vary the tension on said film, and means operable to detachably secure said portion to the drum, means for detachably securing said cylinder on said shaft intermediate said end members, and means yieldingly urging said shaft toward said drum to maintain said end members in contact with the peripheries of said drums, and a portion of the periphery of the cylinder in engagement with the intermediate portion of said film, whereby said cylinder is caused to rotate in synchronism with the movement of said film, a light source arranged on the side of the film opposite to said cylinder, and means operable to effect rotation of said drums.

LEON E. LA BOMBARD.